United States Patent
Lai et al.

(10) Patent No.: US 8,531,365 B2
(45) Date of Patent: Sep. 10, 2013

(54) POWER-SAVING DRIVING METHOD FOR LIQUID CRYSTAL DISPLAY DEVICE

(75) Inventors: Chih-Chang Lai, Tai Chung County (TW); Nai Heng Chang, Tai Chung (TW); Wen-Chun Wang, Tai Chung (TW); Po-Hsien Wang, Tai Chung (TW); Jyun-Sian Li, Tai Nan (TW); Ching-Fu Hsu, Tai Chung County (TW); Wei-Jian Chang, Tai Chung County (TW)

(73) Assignee: Wintek Corporation, Taichung (TW)

( * ) Notice: Subject to any disclaimer, the term of this patent is extended or adjusted under 35 U.S.C. 154(b) by 723 days.

(21) Appl. No.: 12/756,506

(22) Filed: Apr. 8, 2010

(65) Prior Publication Data

US 2010/0259700 A1    Oct. 14, 2010

(30) Foreign Application Priority Data

Apr. 9, 2009  (TW) ................ 98111766 A
Feb. 10, 2010  (TW) ................ 99104069 A

(51) Int. Cl.
*G09G 3/36* (2006.01)
(52) U.S. Cl.
USPC .......................................................... 345/87
(58) Field of Classification Search
USPC .......................................................... 345/87
See application file for complete search history.

(56) References Cited

U.S. PATENT DOCUMENTS

| 5,359,441 | A | | 10/1994 | Mori et al. | |
|---|---|---|---|---|---|
| 5,844,640 | A | * | 12/1998 | Adachi | 349/33 |
| 6,115,017 | A | * | 9/2000 | Mikami et al. | 345/92 |
| 6,295,109 | B1 | | 9/2001 | Kubo et al. | |
| 7,002,651 | B2 | | 2/2006 | Ha et al. | |
| 2005/0030451 | A1 | * | 2/2005 | Liu | 349/113 |
| 2005/0041169 | A1 | | 2/2005 | Hashimoto et al. | |
| 2005/0140632 | A1 | * | 6/2005 | Tsuda et al. | 345/92 |
| 2006/0060849 | A1 | * | 3/2006 | Kim et al. | 257/59 |
| 2008/0043160 | A1 | * | 2/2008 | Park et al. | 349/38 |
| 2008/0062108 | A1 | * | 3/2008 | Kim | 345/92 |
| 2008/0117196 | A1 | * | 5/2008 | Lee et al. | 345/208 |

FOREIGN PATENT DOCUMENTS

| CN | 101114093 A | 1/2008 |
|---|---|---|
| KR | 2009-0023311 | 3/2009 |

* cited by examiner

*Primary Examiner* — Chanh Nguyen
*Assistant Examiner* — Robert Stone
(74) *Attorney, Agent, or Firm* — Muncy, Geissler, Olds & Lowe, PLLC

(57) ABSTRACT

A liquid crystal display device includes a plurality of pixel units. Each of the pixel units includes a first thin film transistor and a second thin film transistor, a reflective sheet, and a storage capacitor. The channel width/length ratio of the first thin film transistor and the channel width/length ratio of the second thin film transistor are both larger than 12/5. The reflective sheet is disposed adjacent to the first thin film transistor and the second thin film transistor to reflect ambient light. The storage capacitor is formed at a position overlapping the reflective sheet and has a capacitance of larger than 1 pF.

7 Claims, 16 Drawing Sheets

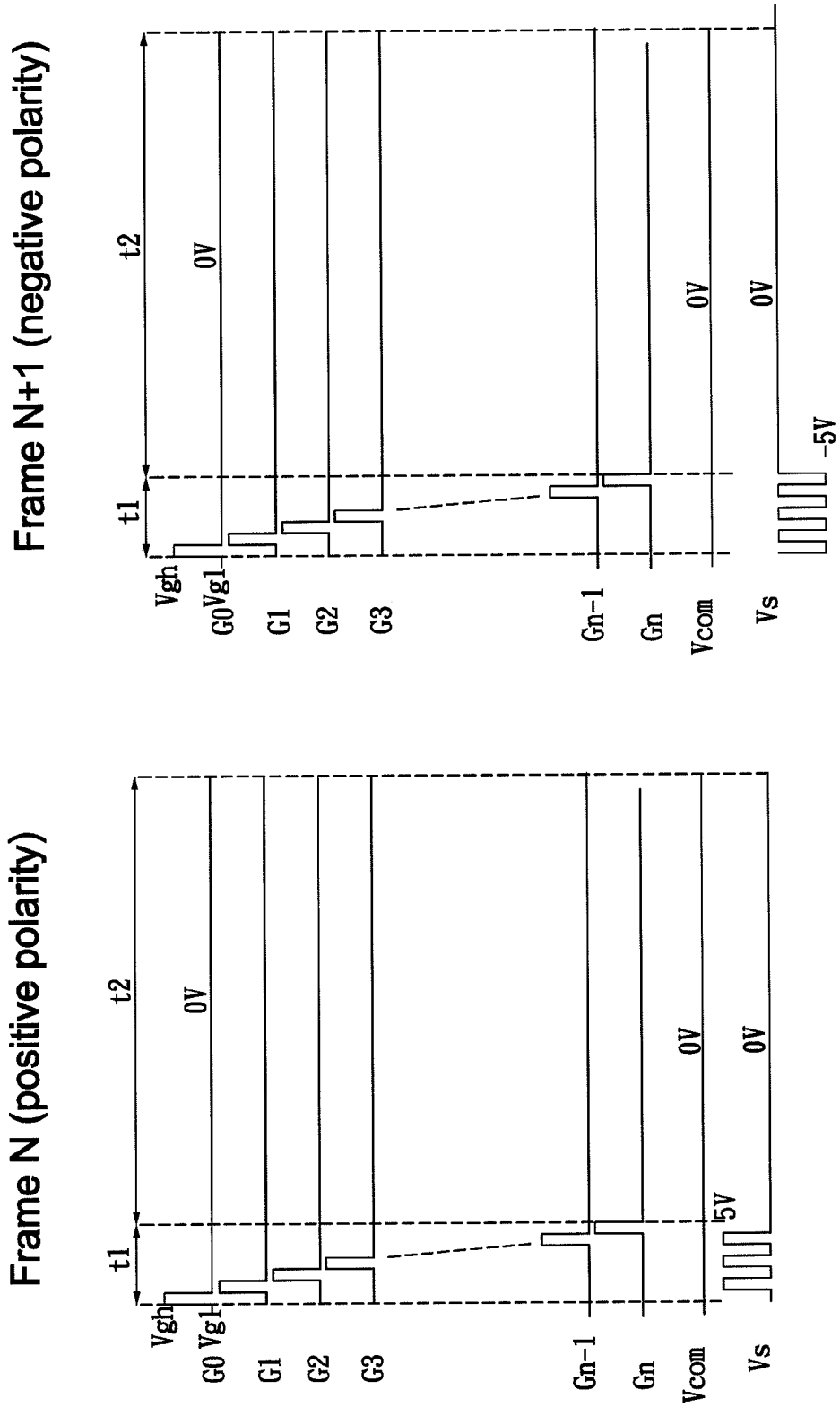

POWER-SAVING DRIVING METHOD FOR LIQUID CRYSTAL DISPLAY DEVICE

BACKGROUND OF THE INVENTION a. Field of the Invention

The invention relates to a liquid crystal device having reduced power consumption and a driving method for the liquid crystal device.

b. Description of the Related Art

FIG. 1 shows a schematic diagram illustrating a conventional reflective-type TFT LCD. Referring to FIG. 1, in the reflective-type TFT LCD 100, a stack of a first metal layer M1 and a second metal layer M2 is used to form a transistor T and a storage capacitor Cst. A reflective sheet 104 disposed on one side of an array substrate 102 is allowed to reflect ambient light I1 to reduce power consumption. FIG. 2 shows a schematic diagram illustrating a conventional transflective-type TFT LCD. Referring to FIG. 2, in the transflective-type TFT LCD 200, each pixel has a transmissive region and a reflective region. The reflective region is formed by a reflective sheet 204 disposed on one side of an array substrate 202. In case the ambient light I1 is not sufficient to provide proper brightness, backlight I2 is used and emits from the transmissive region to increase brightness. In comparison, when the ambient light I1 is sufficient, the backlight I2 is turned off to reduce power consumption and the ambient light I1 is reflected by the reflective region.

However, these conventional designs do not disclose optimum dimensions of the storage capacitor and the corresponding driving scheme to further reduce power consumption.

BRIEF SUMMARY OF THE INVENTION

The invention provides a liquid crystal device having reduced power consumption and a driving method for the liquid crystal device.

According to an embodiment of the invention, a liquid crystal display device includes a plurality of pixel units. Each of the pixel units includes a first thin film transistor and a second thin film transistor, a reflective sheet, and a storage capacitor. The channel width/length ratio of the first thin film transistor and the channel width/length ratio of the second thin film transistor are both larger than 12/5. The reflective sheet is disposed adjacent to the first thin film transistor and the second thin film transistor to reflect ambient light. The storage capacitor is formed at a position overlapping the reflective sheet and has a capacitance of lager than 1 pF.

According to another embodiment of the invention, a driving method for a liquid crystal display device includes the steps of dividing the duration of each frame into a driver-on frame time and a driver-off frame time; measuring a voltage drop in the source voltage as a result of feed-through effect and current leakages; and selecting a threshold voltage for a source input signal according to the voltage drop. The liquid crystal display device has a plurality of pixel units and each of the pixel units includes a first thin film transistor, a second thin film transistor and a storage capacitor, The channel width/length ratio of the first thin film transistor and the channel width/length ratio of the second thin film transistor are both larger than 12/5, and the capacitance of the storage capacitor is lager than 1 pF.

In one embodiment, the common voltage and the source voltage are both equal to 0V, and the voltage of each data line is equal to 0V to 5V during the driver-off frame time.

In one embodiment, the frame rate of a drive pulse for driving the liquid crystal display device is no more than 1 Hz.

In one embodiment, the absolute value of a low-level gate voltage in frame N (N is a positive integer) is lower than the absolute value of a low-level gate voltage in frame (N+1), and the absolute value of a high-level gate voltage in frame (N+1) is lower than the absolute value of a high-level gate voltage in frame N.

According to the above embodiments, since the source of a thin film transistor and the common electrode do not dissipate electrical power during the driver-off frame time, and the voltage of each data line and the frame rate are both comparatively low, the overall power consumption is considerably reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

FIG. 18 and FIG. 19 illustrate drive pulses for the TFT device shown in FIG. 17.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
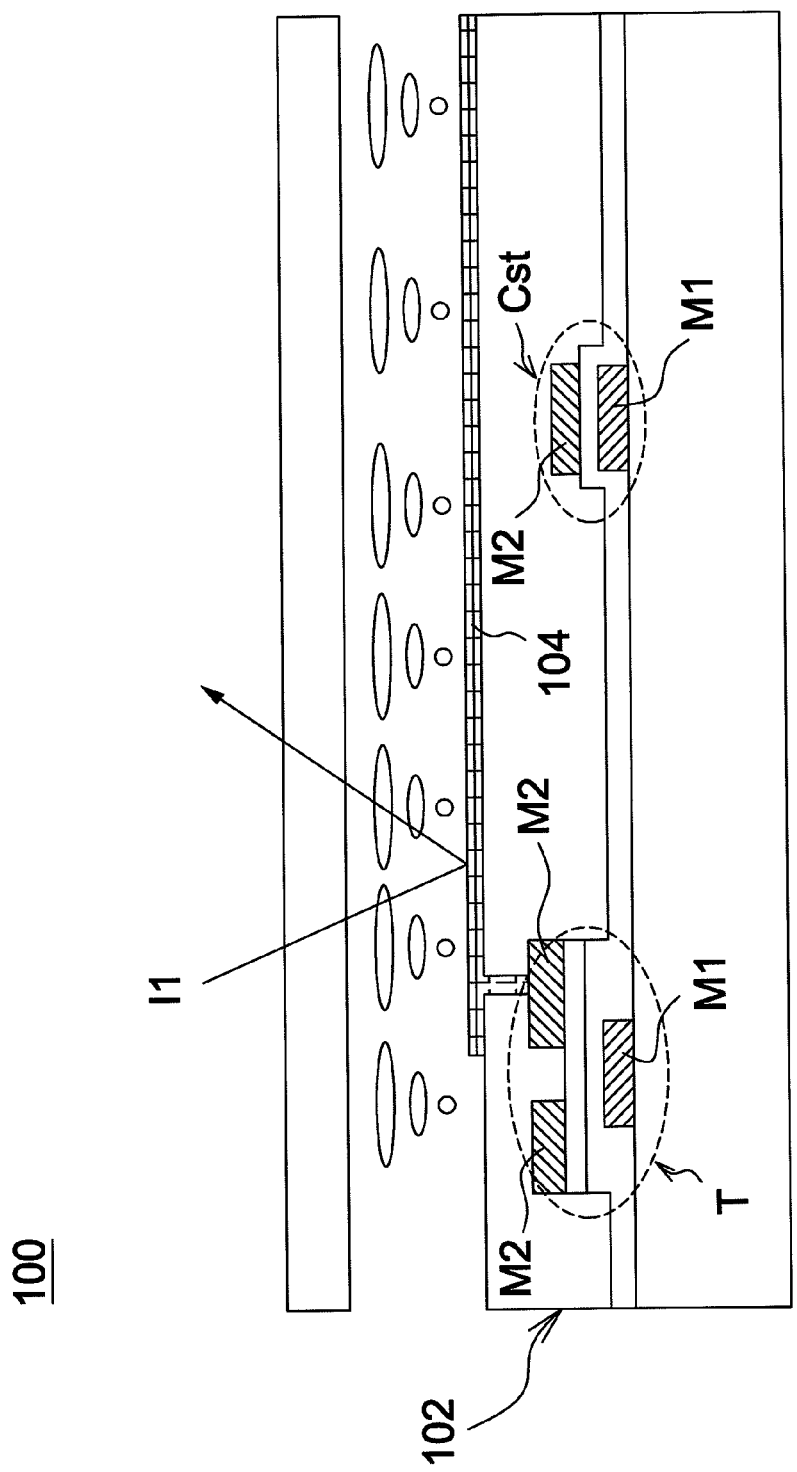
FIG. 1 shows a schematic diagram illustrating a conventional reflective-type TFT LCD.
Figure 2:
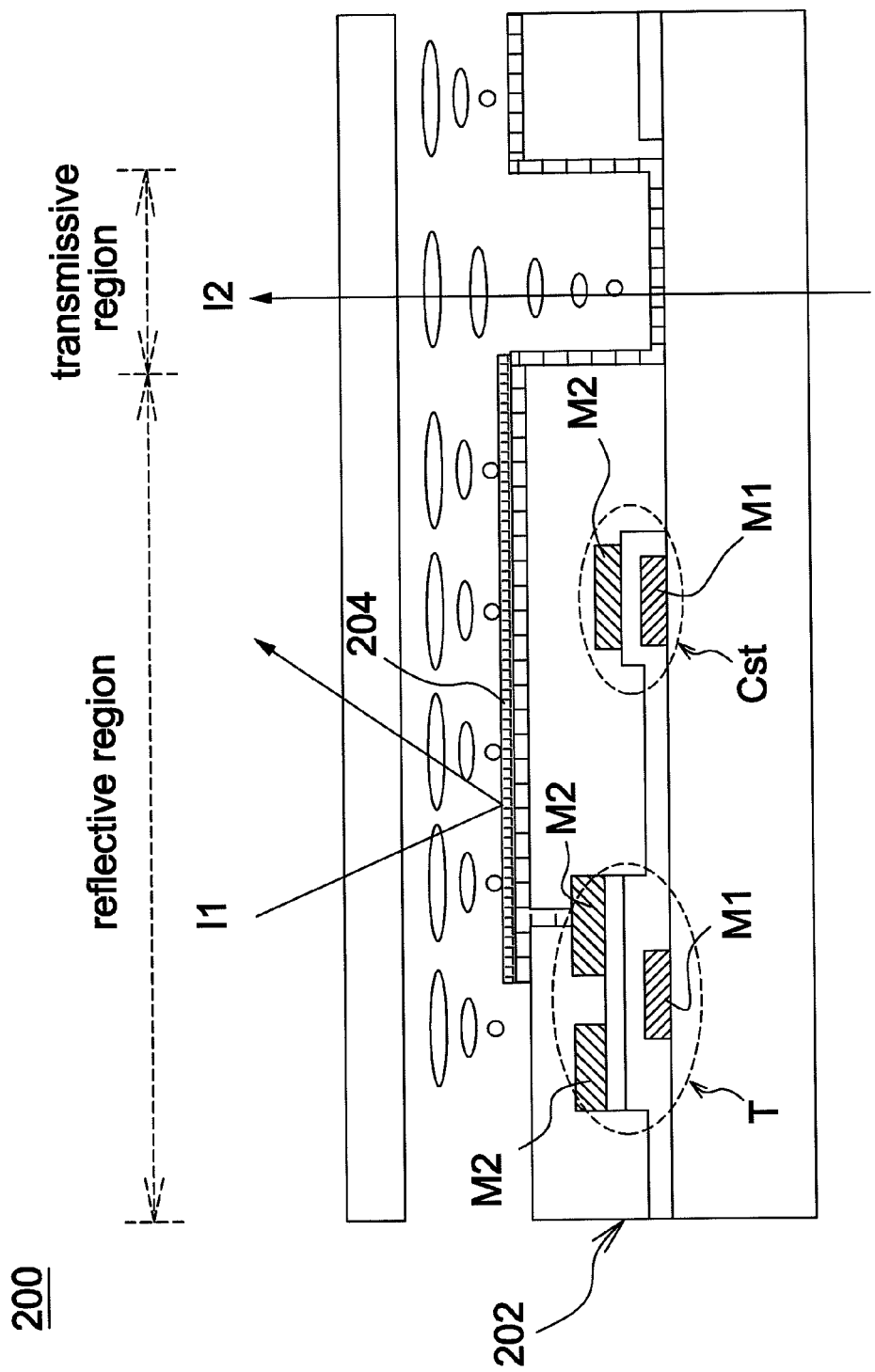
FIG. 2 shows a schematic diagram illustrating a conventional transflective-type TFT LCD.
Figure 3:
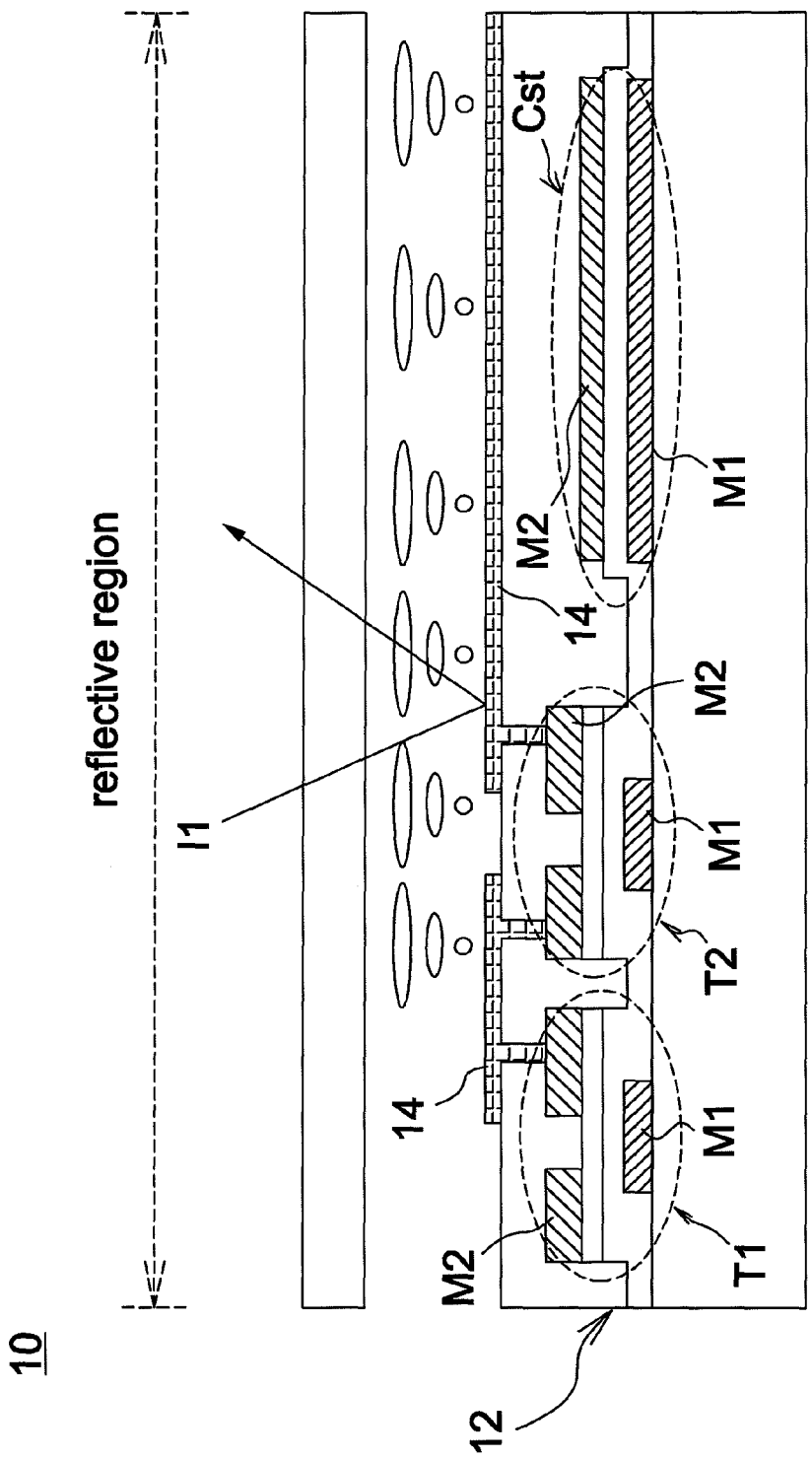
FIG. 3 shows a schematic diagram of a reflective-type TFT LCD according to an embodiment of the invention.
Figure 4:
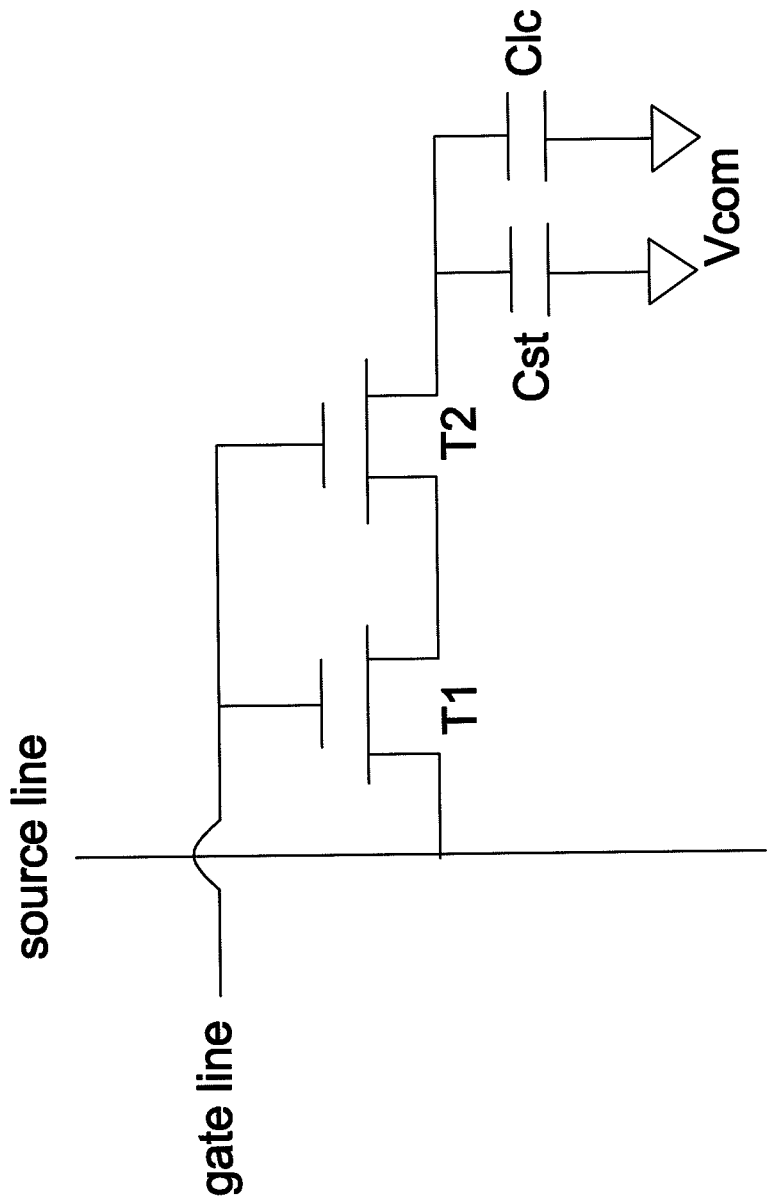
FIG. 4 shows an equivalent circuit diagram of FIG. 3.
Figure 5:
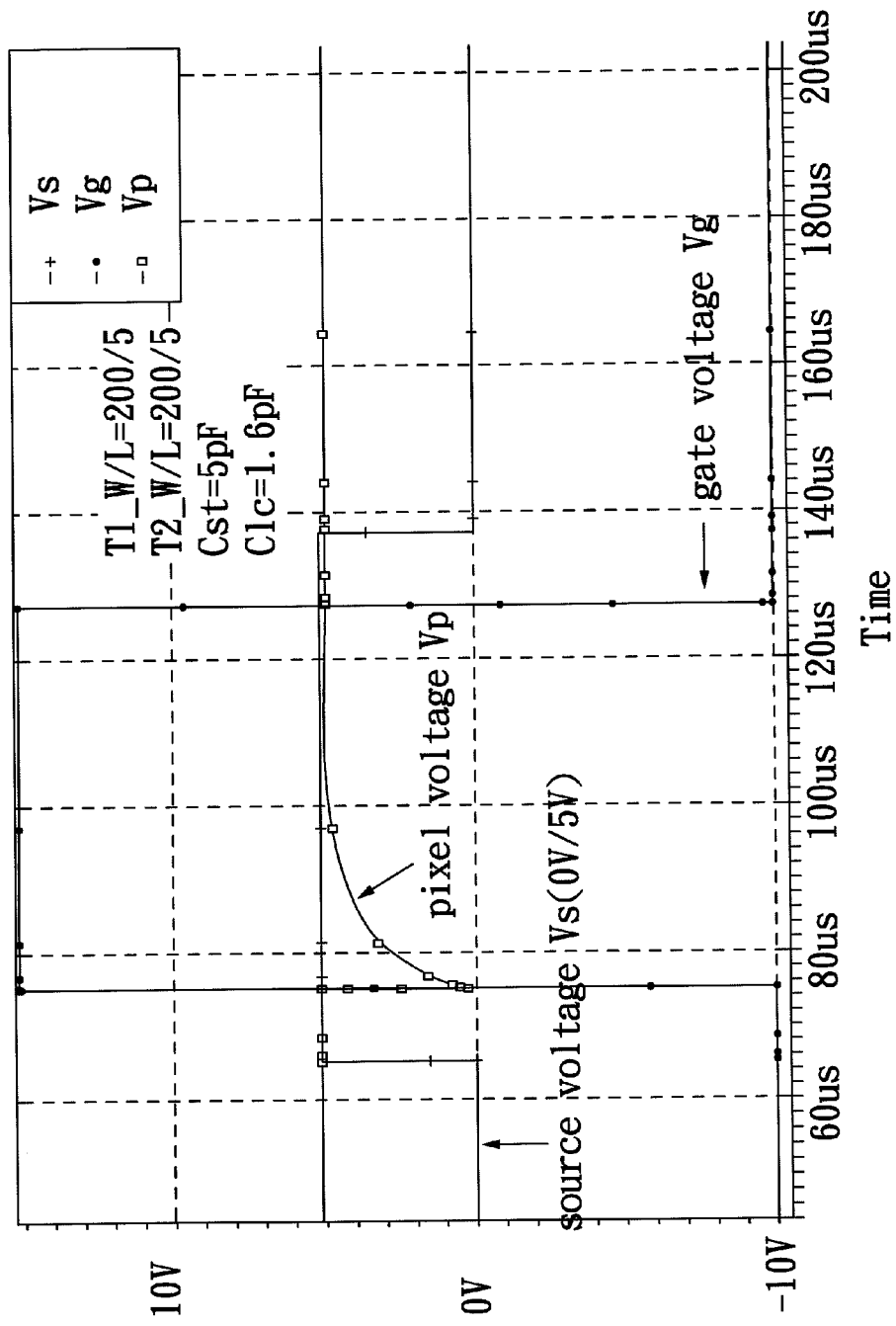
FIG. 5 and FIG. 6 show drive pulses for a TFT LCD according to an embodiment of the invention.
Figure 6:
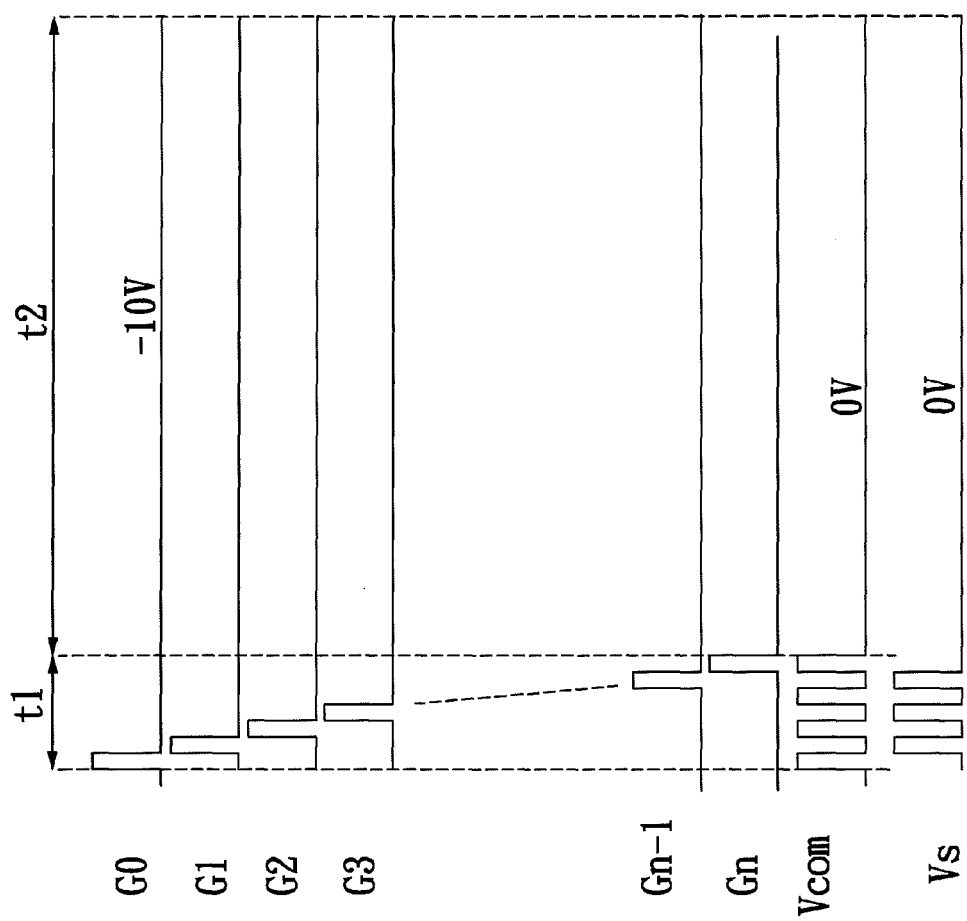

FIG. 3 shows a schematic diagram of a reflective-type TFT LCD according to an embodiment of the invention. Referring to FIG. 3, the reflective-type TFT LCD 10 includes multiple pixel units, and each pixel unit includes two thin film transistors T1 and T2 and a storage capacitor Cst. The thin film transistors T1 and T2 and the storage capacitor Cst are made from a stack of a first metal layer M1 and a second metal layer M2. A reflective sheet 14 is disposed on one side of an array substrate 12 and adjacent to the thin film transistors T1 and T2 to reflect ambient light IL. The reflective sheet 14 may be made of a highly-reflective material such as an aluminum sheet. Also, the storage capacitor Cst is formed at a position overlapping the reflective sheet 14 to improve the aperture ratio of each pixel unit. Please also refer to an equivalent circuit diagram shown in FIG. 4, under a covering of the reflective sheet 14, the area of the storage capacitor Cst is allowed to increase to a greater extent. For example, the capacitance of a conventional storage capacitor shown in FIG. 1 is typically about 0.2 pF; in contrast, the capacitance of a storage capacitor Cst according to the above embodiment is up to 5 pf, which is 25 times as much of 0.2 pF. A comparatively high capacitance of a storage capacitor is allowed to reduce the influence of feed-through effect and lower a voltage drop. Further, the channel width/length ratio W/L of each of the two thin film transistors is equal to 200/5, which is about 12 times as much of a typical channel width/length ratio of 16/5. A comparatively large channel width/length ratio is allowed to increase the amount of a charge current. In this embodiment, as shown in FIG. 5, a pixel voltage Vp is charged to 5V, and two thin film transistors T1 and T2 are electrically connected in series to reduce current leakages. FIG. 6 shows a driving scheme in cooperation with the above reflective pixel structure. Referring to FIG. 6, the duration of each frame is divided into a driver-on frame time t1 and a driver-off frame time t2, where, for example, t1=1/60 sec and t2=59/60 (=1 1/60) sec. During the driver-off frame time t2, the gate voltage Vg=−10V, the common voltage Vcom=0V, and the source voltage Vs=0V. Hence, the source of a thin film transistor and the common electrode do not dissipate electrical power, and the dissipation of electrical power for such driving scheme as well as the overall power consumption are reduced as a result. According to this embodiment, the duration of each frame is divided into a driver-on frame time t1 and a driver-off frame time t2, the driver-off frame time t2 is considerably larger than the driver-on frame time t1, and all gate lines of a liquid crystal display device are addressed during the driver-on frame time t1. Further, during the driver-off frame time t2, the common voltage Vcom and the source voltage Vs are both kept constant and the gate voltage Vg is lower then the common voltage Vcom and the source voltage Vs. Therefore, though the liquid crystal display device consumes the same electrical power as the conventional design does during the driver-on frame time t1, the driver-on frame time t1 according to this embodiment is very short to result in small power consumption. In comparison, during the long driver-off frame time t2, the source of a thin film transistor and the common electrode do not consume electrical power and the voltage of each data line is kept at 0V to considerably reduce power consumption.

Figure 7:
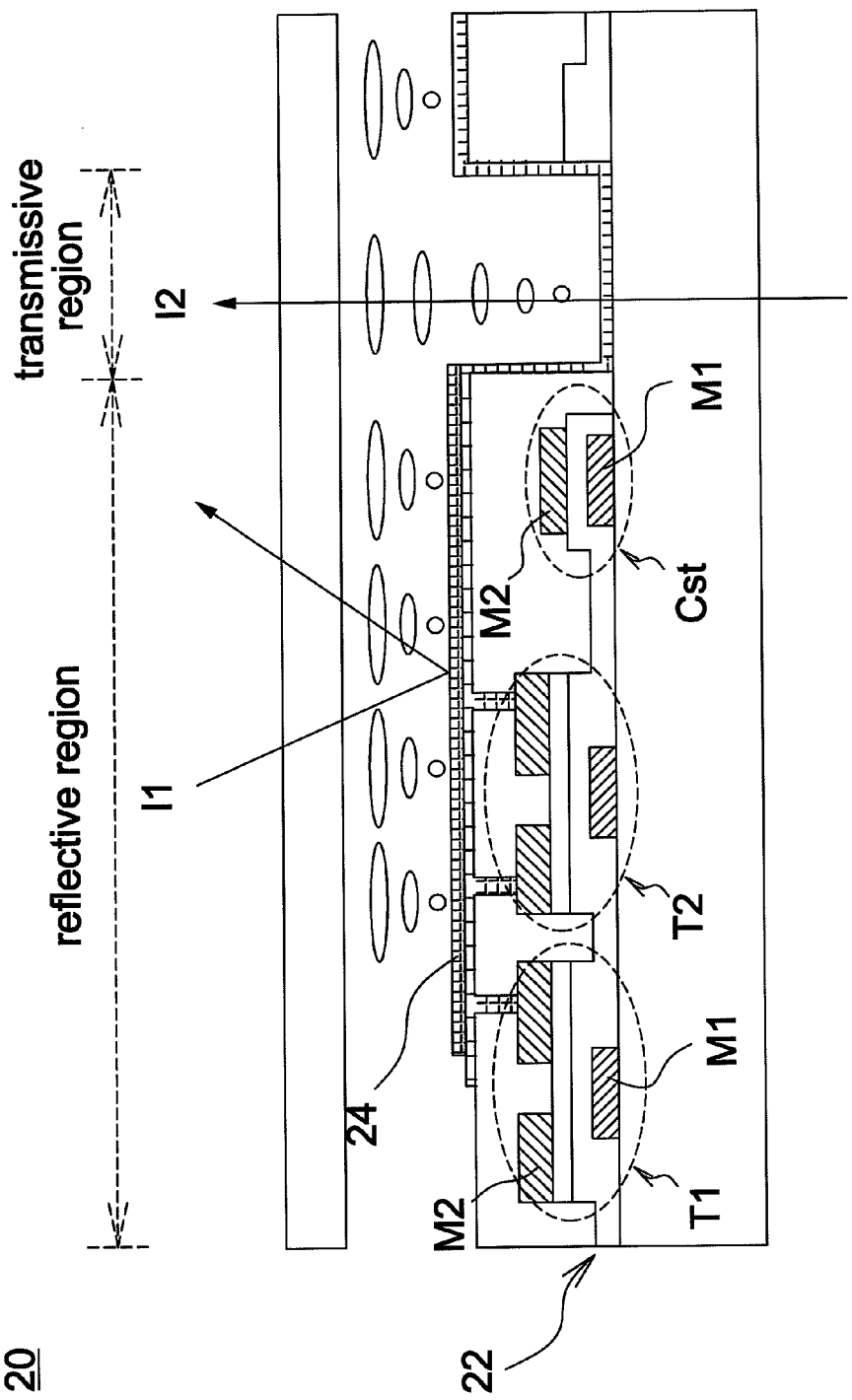
FIG. 7 shows a schematic diagram of a transflective-type TFT LCD according to another embodiment of the invention.
Figure 8:
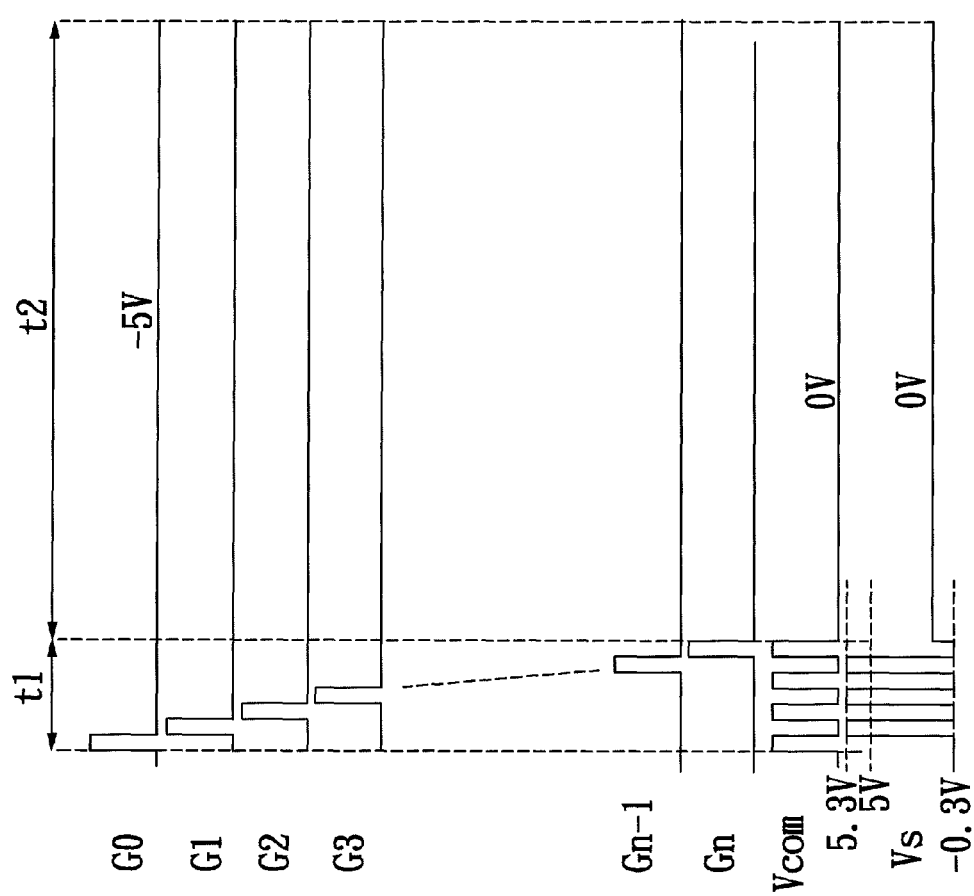
FIG. 8 and FIG. 9 show drive pulses for a TFT LCD according to another embodiment of the invention.
Figure 9:
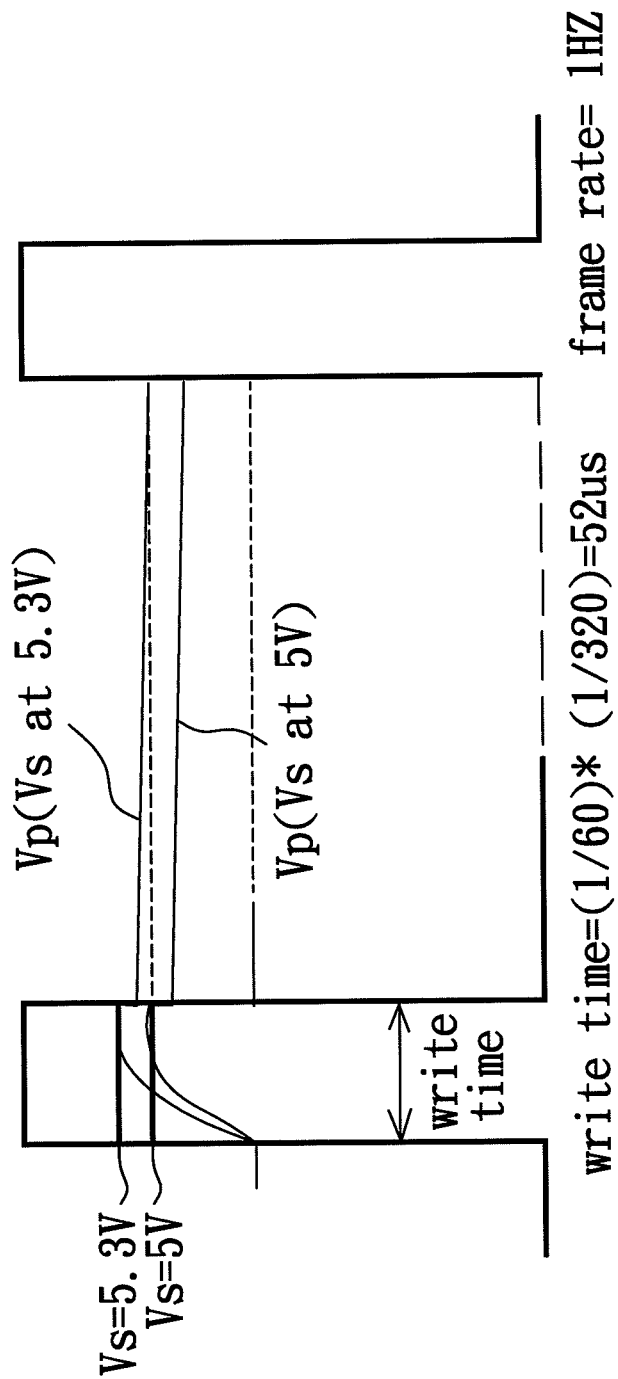

FIG. 7 shows a schematic diagram of a transflective-type TFT LCD according to another embodiment of the invention. Referring to FIG. 7, the transflective-type TFT LCD 20 includes multiple pixel units, and each pixel unit includes two thin film transistors T1 and T2 and a storage capacitor Cst. The thin film transistors T1 and T2 and the storage capacitor Cst are made from a stack of a first metal layer M1 and a second metal layer M2. A reflective sheet 24 is formed on a reflective region of an array substrate 22 to reflect ambient light I1, and a part of the array substrate 22 is formed as a transmissive region to directly transmit backlight I2. The reflective sheet 24 may be made of a highly-reflective material such as an aluminum sheet. Similarly, under a covering of the reflective sheet 24, the area of the storage capacitor Cst is allowed to increase to a greater extent. For example, the capacitance of a conventional storage capacitor shown in FIG. 1 is typically about 0.2 pF; in contrast, the capacitance of a storage capacitor Cst according to this embodiment is up to 5 pf, which is 25 times as much of 0.2 pF. A comparatively high capacitance of a storage capacitor is allowed to reduce the influence of feed-through effect and lower a voltage drop. Further, the channel width/length ratio W/L of each of the two thin film transistors is equal to 200/5, which is about 12 times as much of a typical channel width/length ratio of 16/5. A comparatively large width/length ratio is allowed to increase the amount of a charge current. Similarly, as shown in FIG. 5, a pixel voltage Vp is charged to 5V, and two thin film transistors T1 and T2 are electrically connected in series to reduce current leakages. FIG. 8 shows a driving scheme in cooperation with the above transflective pixel structure. Referring to FIG. 8, the duration of each frame is divided into a driver-on frame time t1 (=1/60 sec) and a driver-off frame time t2 (=59/60 sec). All gate lines of a liquid crystal display device are addressed during the driver-on frame time t1, and, during the driver-off frame time t2, the common voltage Vcom and the source voltage Vs are both kept constant at 0V, and the gate voltage Vg is lower then the common voltage Vcom and the source voltage Vs. Therefore, during the long driver-off frame time t2, the source of a thin film transistor and the common electrode do not consume electrical power and the voltage of each data line is kept at 0V to considerably reduce power consumption. Further, since the driver-off frame time t2 is considerably longer than the driver-on frame time t1, a voltage drop $\Delta V(=0.3V)$ in the source voltage exists as a result of feed-through effect and current leakages. Referring to FIG. 8 and FIG. 9, the threshold source voltage Vs input from the source of a thin film transistor is set as 5.3V instead of 5V, so that an effective operating voltage during the driver-off frame time t2 is gradually decreased from 5.3V to 5V. Hence, the voltage drop is counterbalanced by the preset increase in the source voltage. Further, during the driver-off frame time t2, the gate voltage is kept at −5V, and the common voltage Vcom and the source voltage Vs are both kept at 0V. Thus, the source of a thin film transistor and the common electrode do not consume electrical power.

Figure 10:
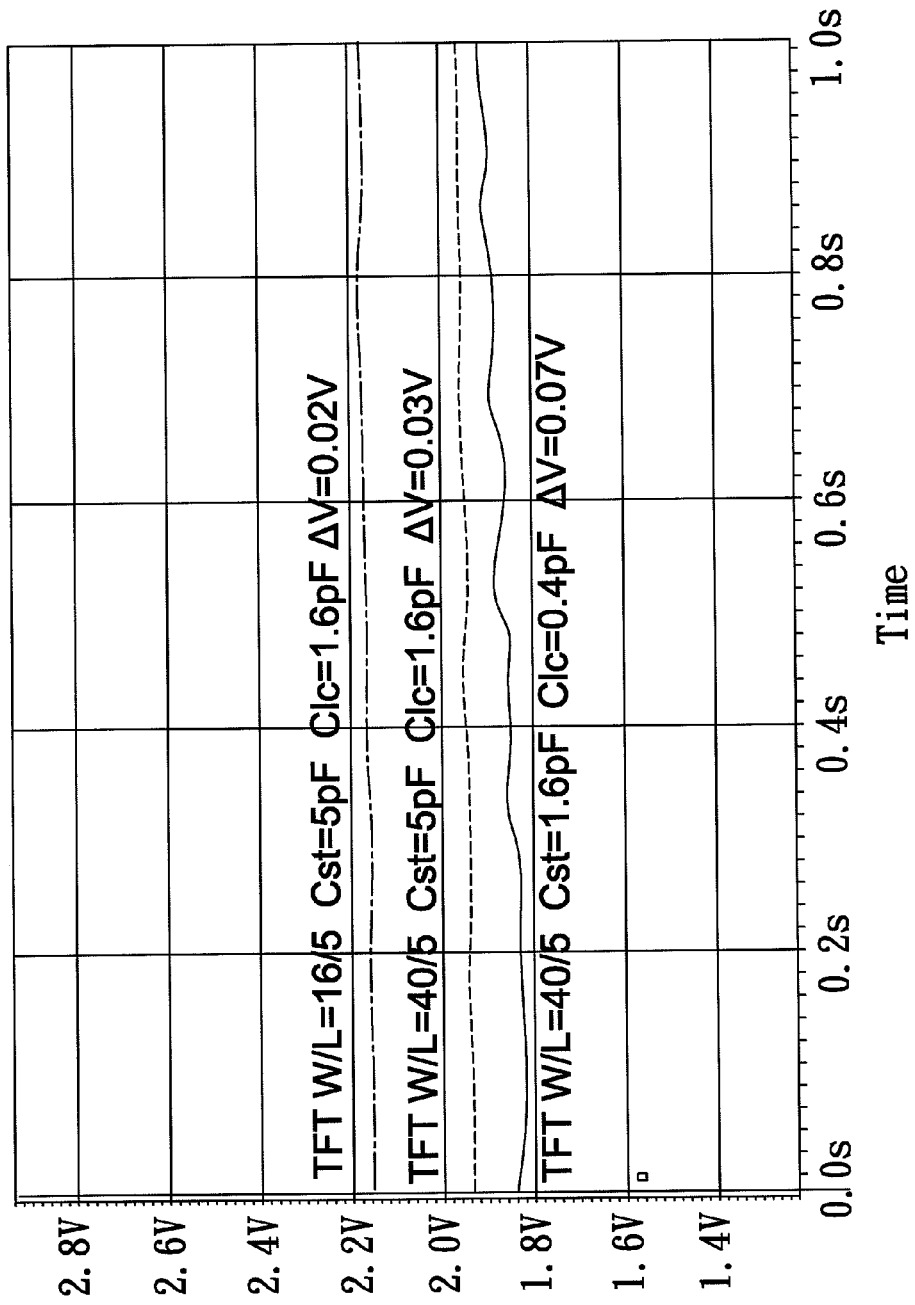
FIG. 10 shows a diagram illustrating the relationship of a voltage drop and the dimension of a storage capacitor.

In addition, from the simulation results shown in FIG. 10, it can be clearly seen a larger storage capacitor Cst eases the current leakage phenomenon. Hence, the capacitance of a storage capacitor in the above embodiments is preferably set as larger than 1 pF. Also, since a thin film transistor with a larger channel width/length ratio has a shorter time to charge the storage capacitor Cst, the channel width/length ratio W/L of a thin film transistor is preferably set as W/L>12/5. Besides, since the frame rate of a drive pulse is deceased as the area of a storage capacitor Cst increases, the frame rate according to the above embodiments is decreased to 1 Hz to reduce the overall power consumption of a display device.

Figure 11:
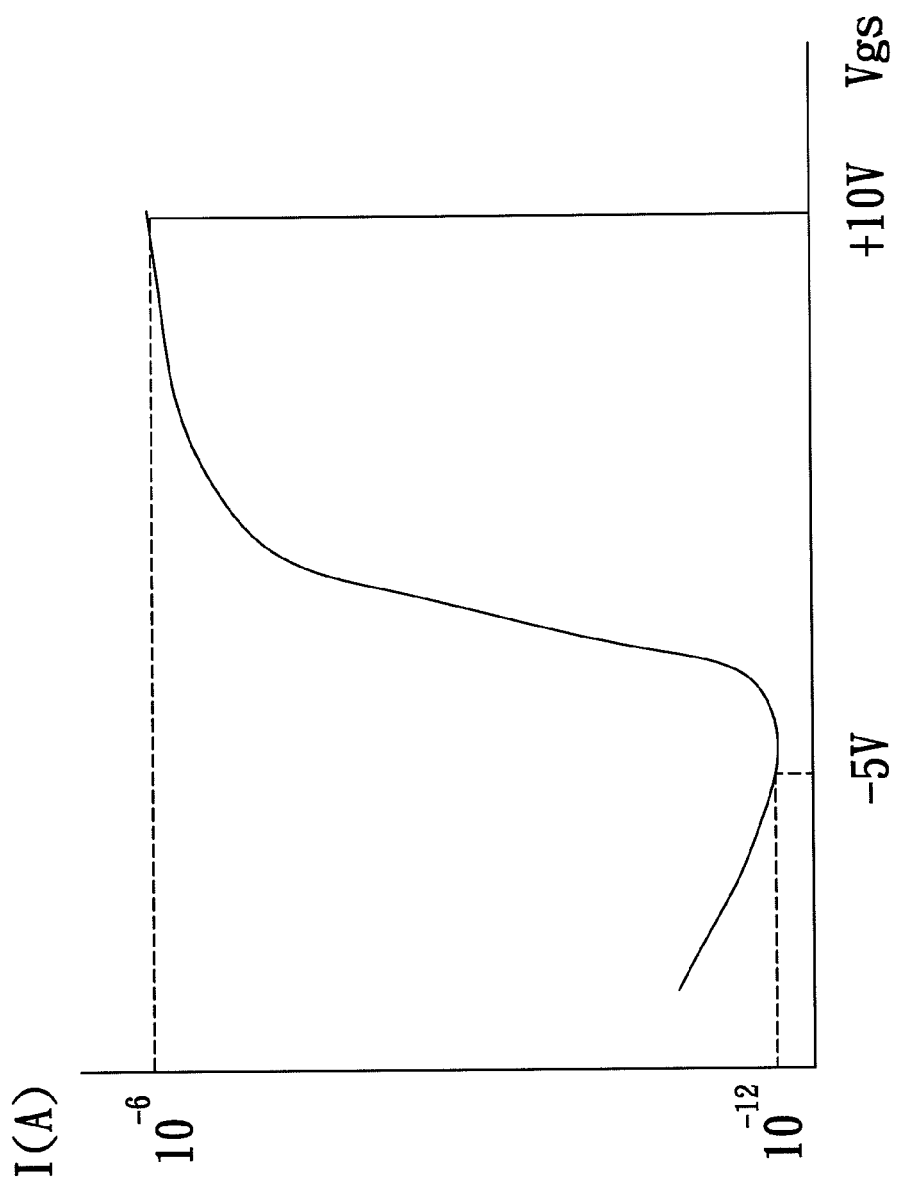
FIG. 11 shows a schematic diagram illustrating the characteristic curve of a TFT device according to an embodiment of the invention.
Figures 12, 13:
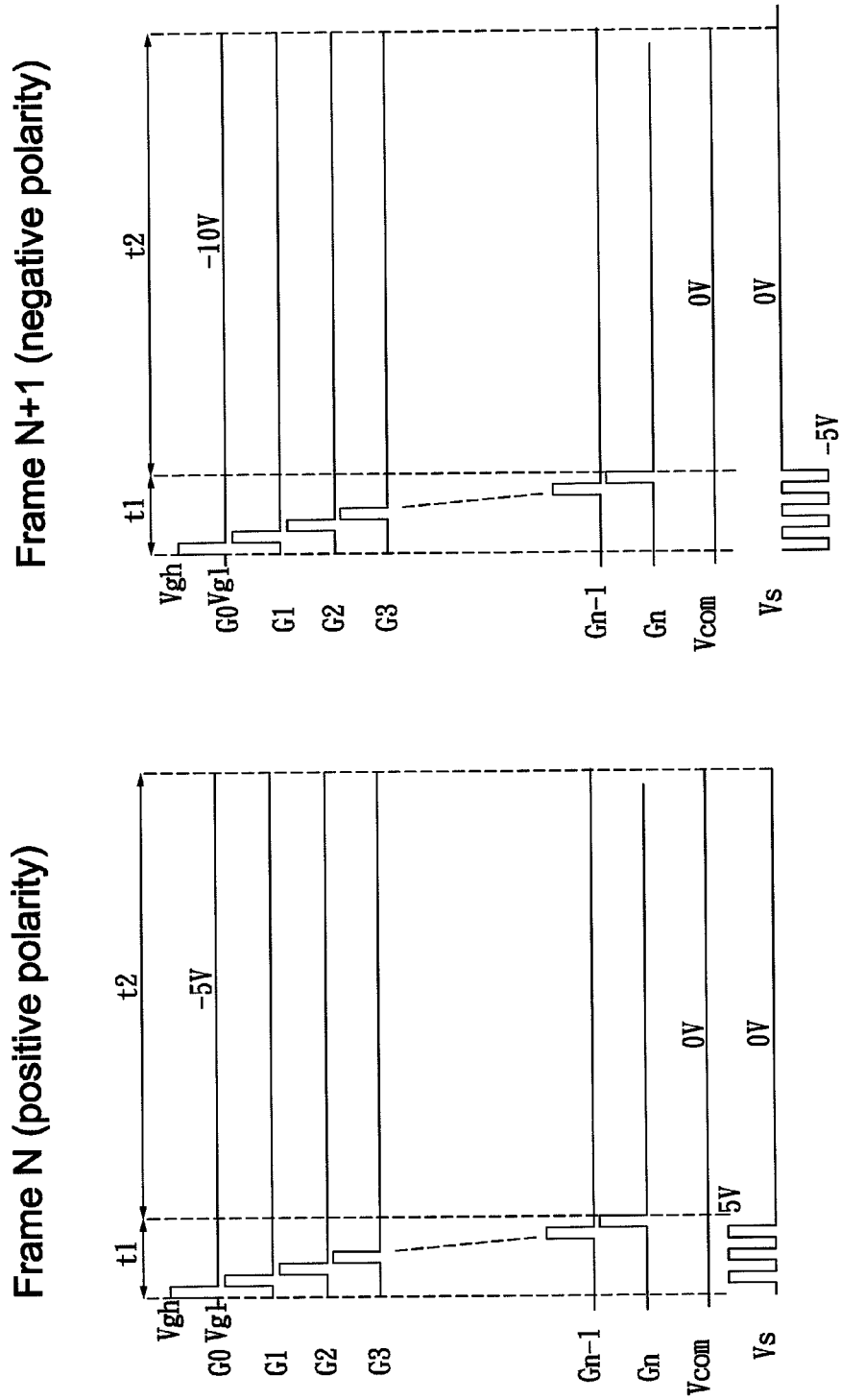
FIG. 12 and FIG. 13 illustrate drive pulses for the TFT device shown in FIG. 11.

FIG. 11 shows a schematic diagram illustrating the characteristic curve of a TFT device according to an embodiment of the invention. Referring to FIG. 11, a voltage difference between the gate and the source of a TFT is denoted as Vgs, and the TFT is turned on as Vgs=10V and turned off as Vgs=−5V. Hence, as shown in FIG. 12 and FIG. 13, in frame N (N is a positive integer), since the TFT is turned off as Vgs=−5V and the voltage of each data line is equal to 0V to 5V, a low-level gate voltage Vgl to address gate lines G0-Gn is set as −5V, and a high-level gate voltage Vgh to address gate lines G0-Gn is set as 15V. Further, in frame N+1, since the TFT is turned off as Vgs=−5V and the voltage of each data line is equal to −5V to 0V, a low-level gate voltage Vgl to address gate lines G0-Gn is set as −10V, and a high-level gate voltage Vgh to address gate lines G0-Gn is set as 10V. In this embodiment, the low-level gate voltage Vgl in frame N is set as −5V, which is more close to 0V compared with Vgl=−10V in frame N+1. Besides, the high-level gate voltage Vgh in frame N+1 is set as 10V, which is more close to 0V compared with Vgh=15V in frame N. This results in reduced power consumption (note power P=current I * voltage V, a lower absolute value of voltage V naturally decreases power P).

Figure 14:
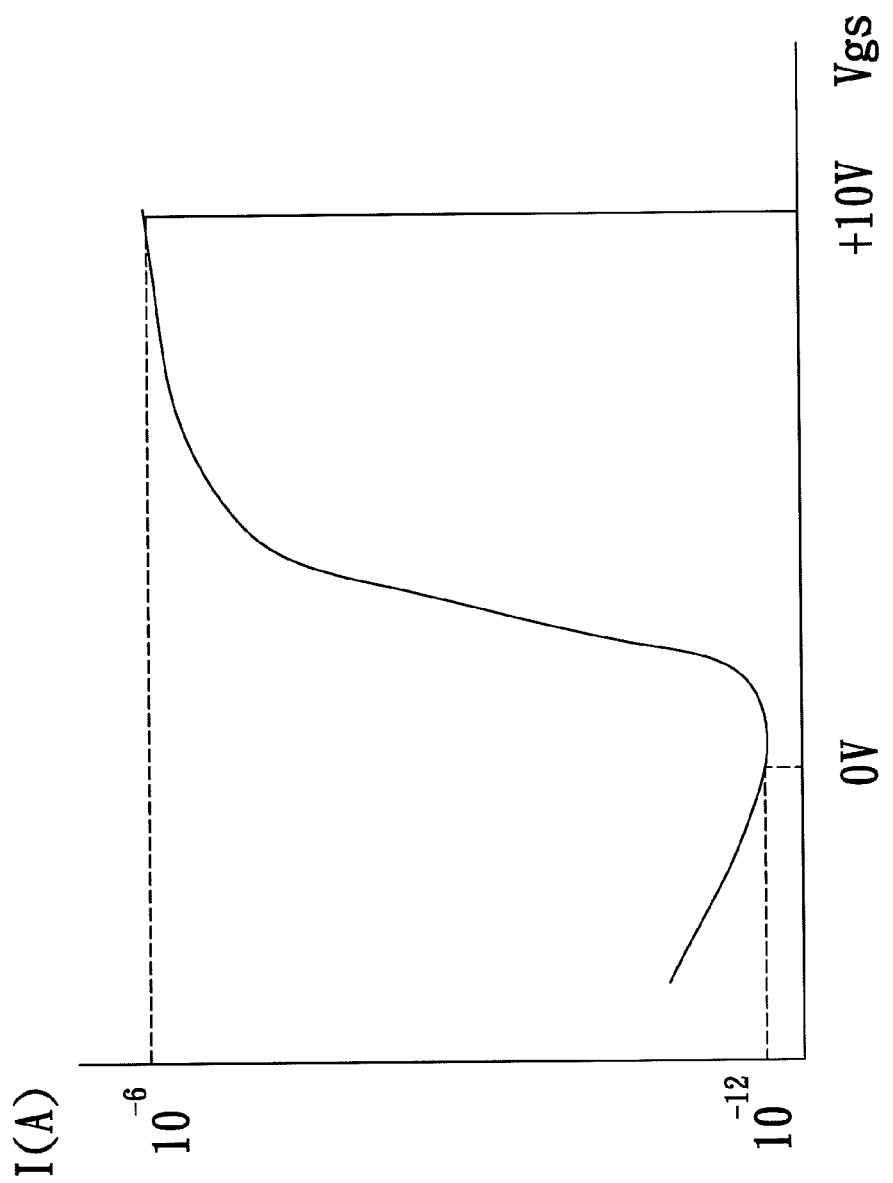
FIG. 14 shows a schematic diagram illustrating the characteristic curve of a TFT device according to another embodiment of the invention.
Figure 16:
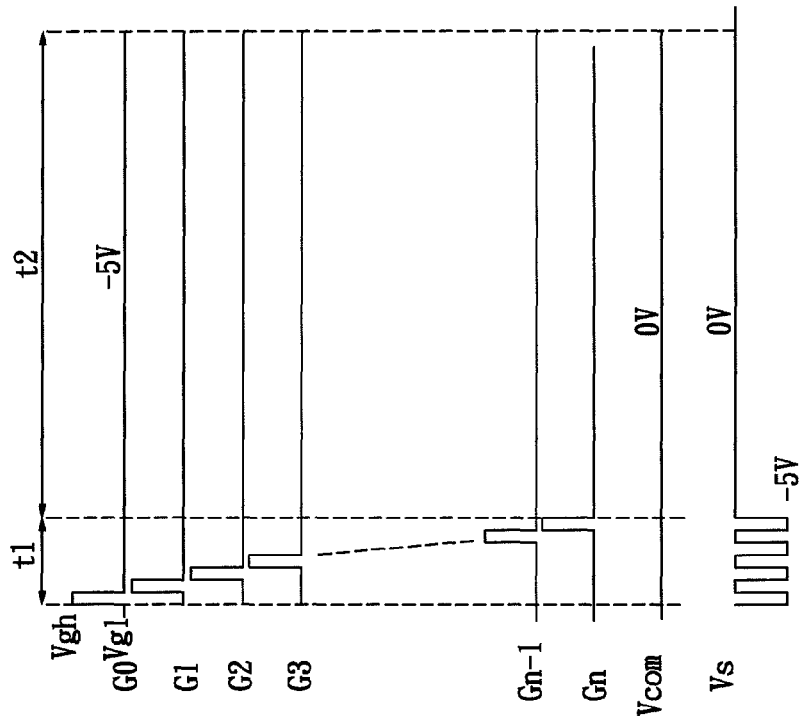
FIG. 15 and FIG. 16 illustrate drive pulses for the TFT device shown in FIG. 14.
Figure 15:
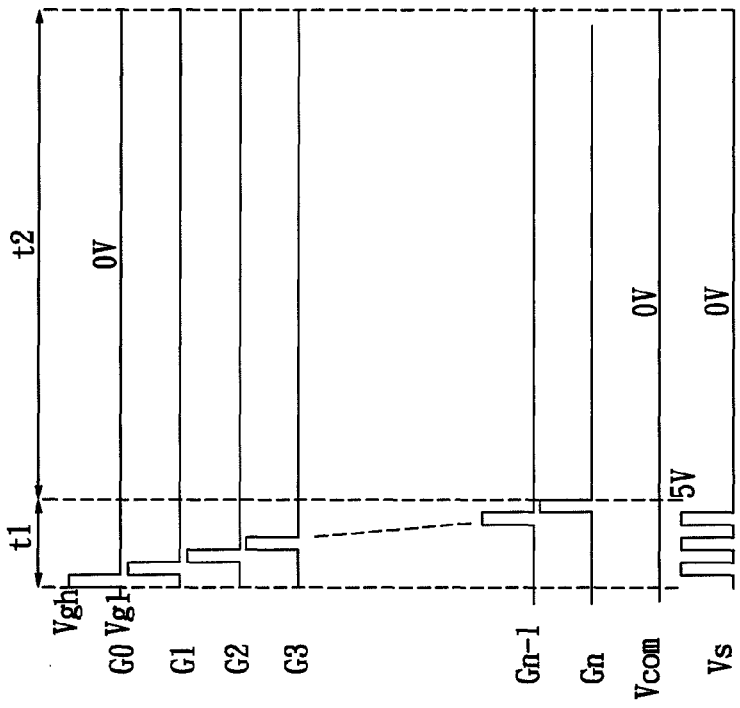

FIG. 14 shows a schematic diagram illustrating the characteristic curve of a TFT device according to another embodiment of the invention. Referring to FIG. 14, the TFT is turned on as Vgs=10V and turned off as Vgs=0V. Hence, as shown in FIG. 15 and FIG. 16, in frame N, since the TFT is turned off as Vgs=0V and the voltage of each data line is equal to 0V to 5V, a low-level gate voltage Vgl to address gate lines G0-Gn is set as 0V, and a high-level gate voltage Vgh to address gate lines G0-Gn is set as 15V. Further, in frame N+1, since the TFT is turned off as Vgs=0V and the voltage of each data line is equal to −5V to 0V, a low-level gate voltage Vgl is set as −5V, and a high-level gate voltage Vgh is set as 10V. In this embodiment, the low-level gate voltage Vgl in frame N is set as 0V, which is certainly close to 0V compared with Vgl=−5V in frame N+1. Besides, the high-level gate voltage Vgh in frame N+1 is set as 10V, which is more close to 0V compared with Vgh=15V in frame N. This results in reduced power consumption.

Figure 17:
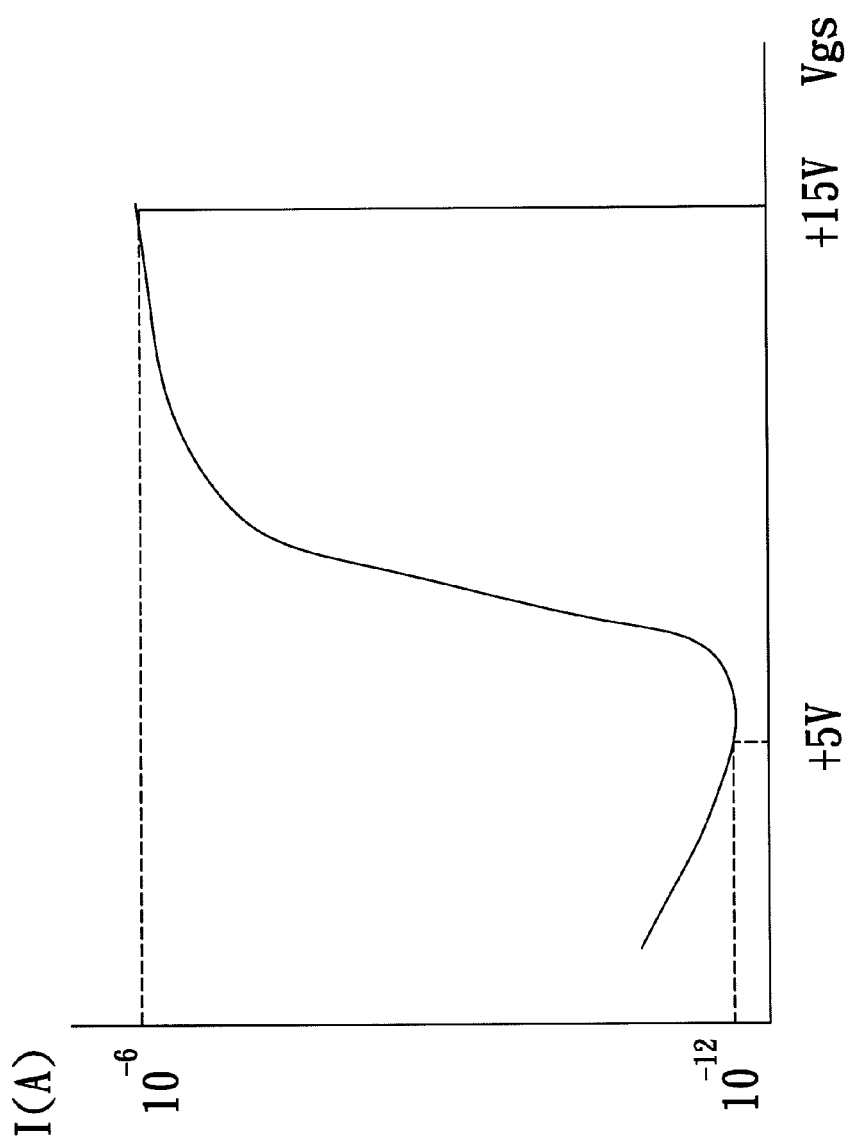
FIG. 17 shows a schematic diagram illustrating the characteristic curve of a TFT device according to another embodiment of the invention.

FIG. 17 shows a schematic diagram illustrating the characteristic curve of a TFT device according to another embodiment of the invention. Referring to FIG. 17, the TFT is turned on as Vgs=15V and turned off as Vgs=5V. Hence, as shown in FIG. 18 and FIG. 19, in frame N, since the TFT is turned off as Vgs=5V and the voltage of each data line is equal to 0V to 5V, a low-level gate voltage Vgl to address gate lines G0-Gn is set as 0V, and a high-level gate voltage Vgh to address gate lines G0-Gn is set as 20V. Further, in frame N+1, since the TFT is turned off as Vgs=5V and the voltage of each data line is equal to −5V to 0V, a low-level gate voltage Vgl is set as 0V, and a high-level gate voltage Vgh is set as 15V. In this embodiment, the low-level gate voltage Vgl in both frame N and frame N+1 is allowed to set as 0V to reduce power consumption.

Hence, according to the above embodiments, the aforesaid driving scheme is allowed to cooperate with different thin film transistors having distinct characteristic curves to reduce power consumption.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A driving method for a liquid crystal display device, the liquid crystal display device having a plurality of pixel units and each of the pixel units comprising a first thin film transistor, a second thin film transistor and a storage capacitor, wherein the channel width/length ratio of the first thin film transistor and the channel width/length ratio of the second thin film transistor are both larger than 12/5 and the capacitance of the storage capacitor is larger than 1 pF, the driving method comprising the following step:

dividing the duration of each frame into a driver-on frame time and a driver-off frame time, the driver-off frame time being larger than the driver-on frame time and all gate lines of the liquid crystal display device being addressed during the driver-on frame time, wherein, during the driver-off frame time, a common voltage and a source voltage of the liquid crystal display device are both kept constant and a gate voltage of the liquid crystal display device is lower than the common voltage and the source voltage;

measuring a voltage drop in the source voltage as a result of feed-through effect and current leakages; and selecting a threshold voltage for a source input signal according to the voltage drop.

2. The driving method as claimed in claim 1, wherein the common voltage and the source voltage are both equal to 0V during the driver-off frame time.

3. The driving method as claimed in claim 1, wherein the frame rate of a drive pulse for driving the liquid crystal display device is no more than 1 Hz.

4. The driving method as claimed in claim 1, wherein the liquid crystal display device includes a plurality of data lines, and the voltage of each data line is equal to 0V to 5V.

5. The driving method as claimed in claim 4, wherein the voltage of each data line is equal to 0V during the driver-off frame time.

6. The driving method as claimed in claim 1, wherein the absolute value of a low-level gate voltage in frame N (N is a positive integer) is lower than the absolute value of a low-level gate voltage in frame (N+1), and the absolute value of a high-level gate voltage in frame (N+1) is lower than the absolute value of a high-level gate voltage in frame N.

7. The driving method as claimed in claim 1, wherein a low-level gate voltage in frame N is equal to a low-level gate voltage in frame (N+1).

* * * * *